United States Patent [19]
Wakui et al.

[11] Patent Number: 5,469,009
[45] Date of Patent: Nov. 21, 1995

[54] TURBINE GENERATOR

[75] Inventors: Shinichi Wakui; Kazumasa Ide, both of Hitachi; Haruo Koharagi, Jyuou; Miyoshi Takahashi; Kado Miyakawa, both of Hitachi; Yasuomi Yagi, Hitachi, all of Japan

[73] Assignee: Hitachi, Ltd., Tokyo, Japan

[21] Appl. No.: 261,381

[22] Filed: Jun. 15, 1994

[30] Foreign Application Priority Data

Jun. 18, 1993 [JP] Japan ................... 5-147280

[51] Int. Cl.$^6$ ................................. H02K 3/46
[52] U.S. Cl. ................ 310/214; 310/179; 310/218; 310/261
[58] Field of Search .................... 310/179, 214, 310/216, 218, 261

[56] References Cited

U.S. PATENT DOCUMENTS

| | | | |
|---|---|---|---|
| 2,484,007 | 10/1949 | Atwell | 310/214 |
| 3,766,417 | 10/1973 | Hallenbeck | 310/214 |
| 4,739,207 | 4/1988 | Ying et al. | 310/214 |
| 4,843,271 | 6/1989 | Shah | 310/217 |
| 4,900,964 | 2/1990 | Ying et al. | 310/215 |
| 4,908,537 | 3/1990 | Sismour | 310/51 |
| 5,252,875 | 10/1993 | Vermesi et al. | 310/114 |

FOREIGN PATENT DOCUMENTS

| | | | |
|---|---|---|---|
| 0142502 | 11/1979 | Japan | 310/214 |
| 0026033 | 2/1980 | Japan | 310/214 |
| 60-34340 | 8/1985 | Japan | H02K 1/26 |
| 0228958 | 9/1988 | Japan | 310/261 |
| 5-64015 | 9/1993 | Japan | H02K 3/42 |

Primary Examiner—Thomas M. Dougherty
Attorney, Agent, or Firm—Fay, Sharpe, Beall, Fagan, Minnich & McKee

[57] ABSTRACT

The rotor 2 of a rotating field type turbine generator is provided with slots 3 for accommodating the field windings, wedges 4 positioned at the portions of the magnetic poles on the rotor 2 for holding the field windings and wedges 5 positioned between the magnetic poles on the rotor. These wedges 4 and 5 are constituted by metal bars without joints to enhance damper effect thereby. Magnetomotive forces due to higher harmonics, which causes temperature rise of the rotor 2 and torque ripple during starting with thyristors, induces an elliptic rotating magnetic field having the longer diameter on d axis extending in the direction of magnetomotive force induced by the field windings and the shorter diameter on q axis perpendicular to d axis, and thus a larger eddy current is induced flowing along q axis on the rotor 2 than that flowing along d axis. Therefore the thickness d' in radial direction of the wedges 5 positioned between the magnetic poles on the rotor 2 is determined larger than the thickness d in radial direction of the wedges 4 positioned at the portions of the magnetic poles on the rotor 2 to reduce the resistance of the wedges 5 and to easily lead the eddy current flowing in the axial direction of the rotor 2, thereby a good thermal balance over the entire portions on the rotor 2 is achieved. Drawings to Be Selected FIG. 1

13 Claims, 9 Drawing Sheets

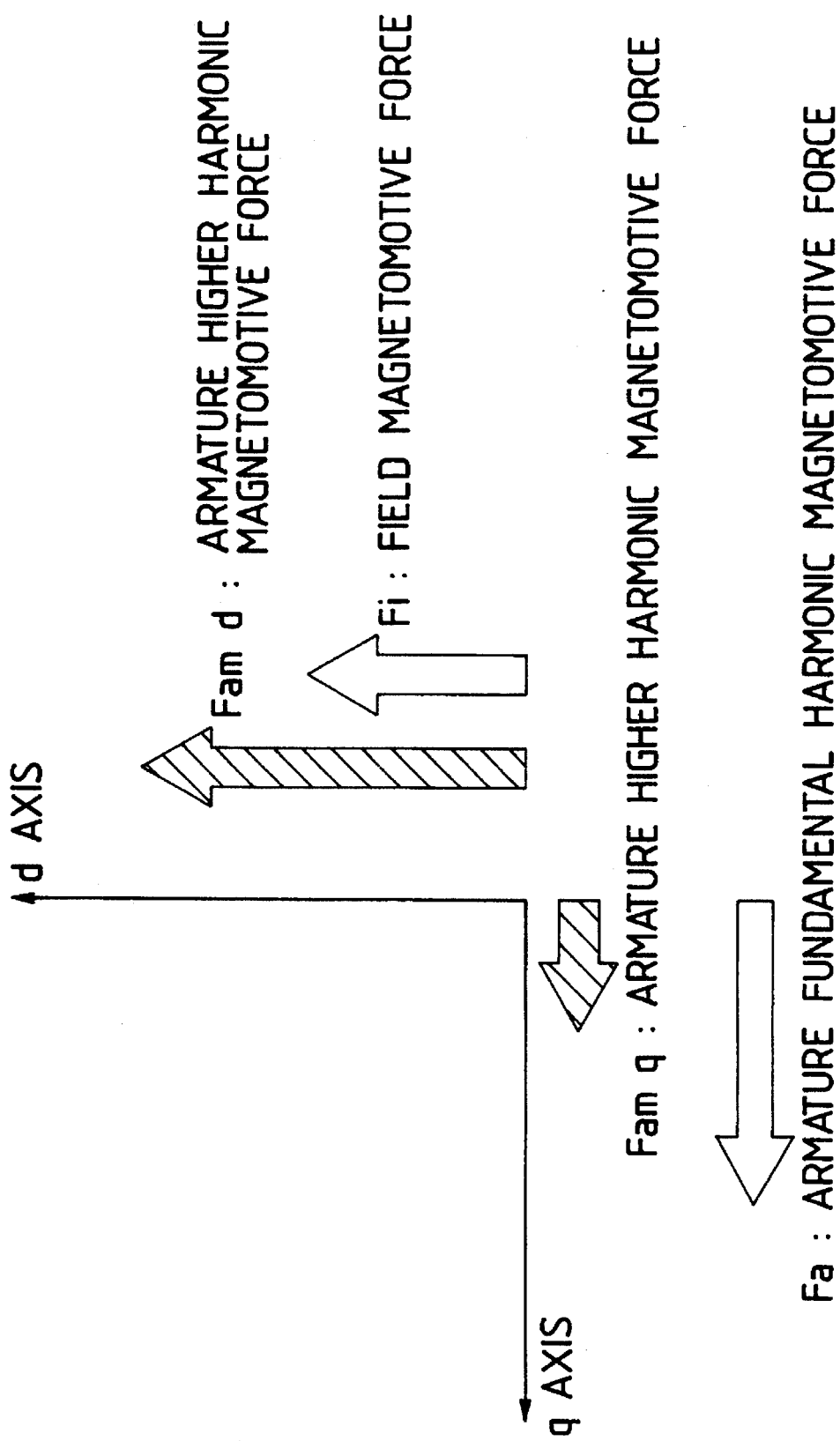

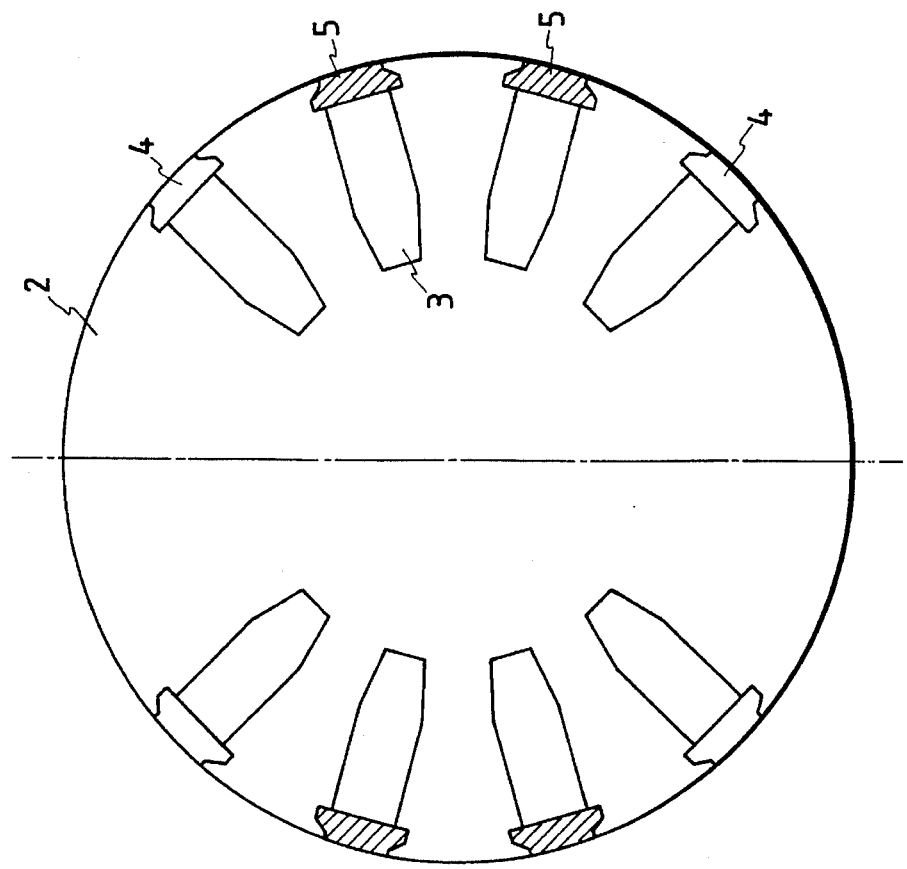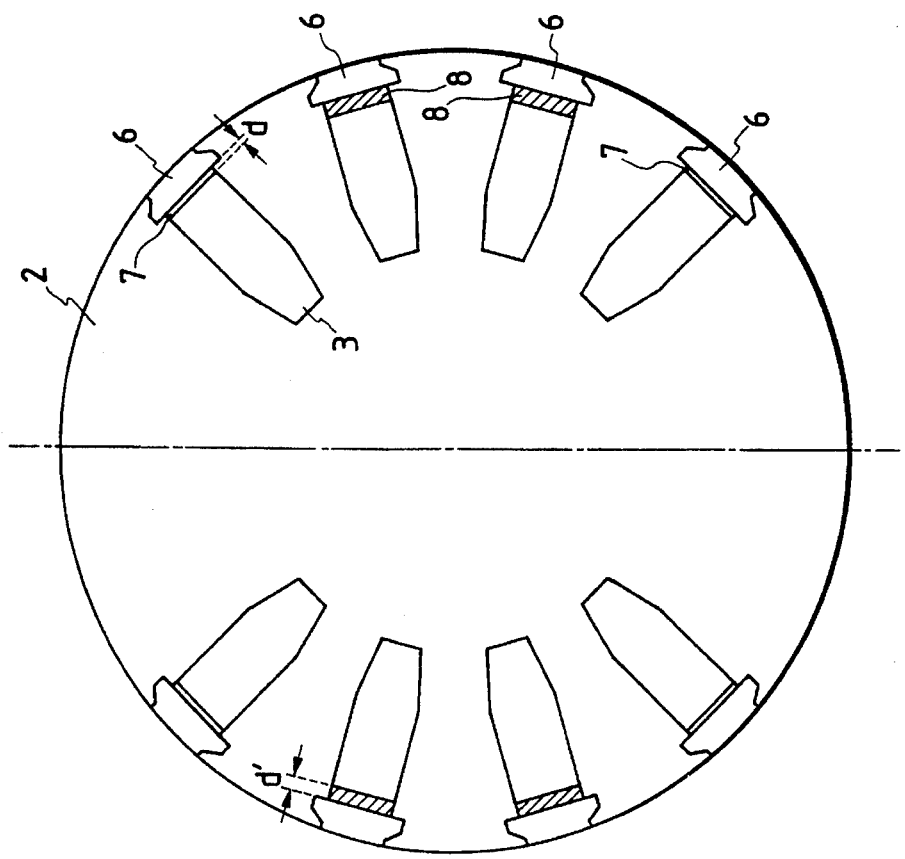

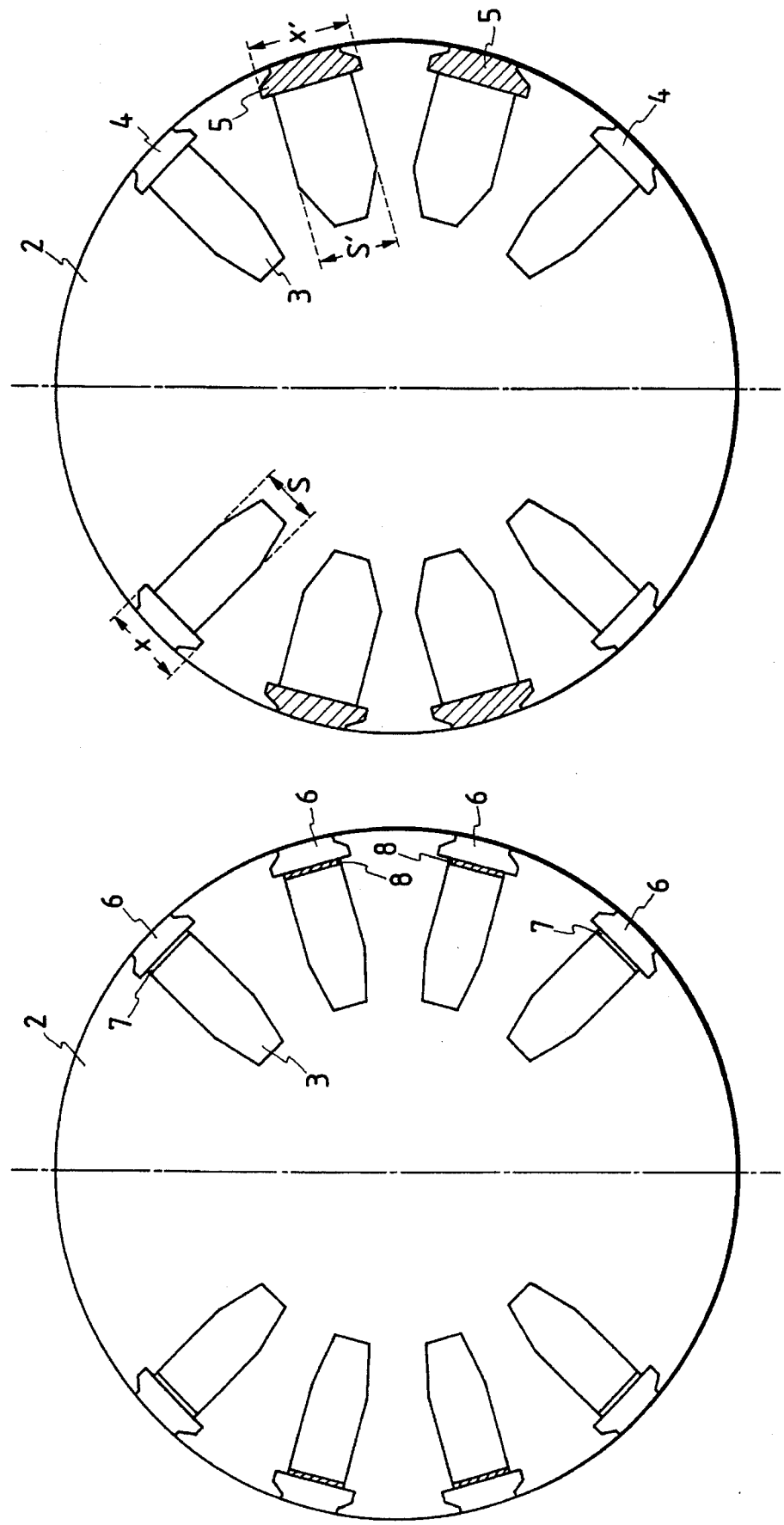

TURBINE GENERATOR

BACKGROUND OF THE INVENTION

The present invention relates to a turbine generator and, in particular, relates to a turbine generator which is suitable for starting the turbine generator as a variable speed synchronous motor through connecting armature windings of the turbine generator with a thyristor type starting device during starting thereof.

These days, a combined cycle electric power generation has drawn attention in view of energy resorces saving.

FIG. 2 shows a constitution diagram of a combined cycle electric power generation system.

A combined cycle electric power generation unit consists of a gas turbine 10, a stream turbine 11 which uses remaining heat in the exhaust gas from the gas turbine 10 as heat source for the boiler and a turbine generator 12. A set of the gas turbine 10, the steam turbine 11 and the turbine generator 12 is arranged along a common axis, and since the capacity of a single turbine generator is limited, a unit plant is composed of in a multi axis form. In other words, a combined cycle electric power generation plant is located near urban area having a large electric power demand and is operated on DSS (every day start and stop) base, in that gas turbines 10 are successively started dependent upon the loads for the plant.

Further, because of combustion temperature increase for achieving a high efficiency a capacity of the gas turbine in the combined cycle electric power generation plant increases, and accordingly a capacity increase of a starting device for the gas turbine is necessitated.

In a conventional starting device for starting the gas turbine, a torque converter system was used in which a torque converter and an induction motor is directly coupled at a power train axial end.

However, because of manufacturable size limit of the torque converter, the capacity increase of the starting device became difficult, therefore realization of thyristor type starting system is strongly demanded. The thyristor type starting system is one in which the turbine generator 12 is started in a form of a variable speed synchronous motor by making use of a thyristor type starting device 13 and through provision of a change-over device 1 between the turbine generators 12 and the thyristor starting device 13, the single thyristor starting device 13 can be commonly used. Namely, the thyristor starting system can be used as a starting device for a particular gas turbine 10 having a large capacity as well as the single thyristor starting device 13 can be commonly used for starting other gas turbines 10 on multiple axises, therefore a compact building can accommodate all of these constituting devices.

On one hand, in a conventional generator, the rotor thereof is provided with field windings which excite the generator while receiving a DC current from an exciting current source and the stator thereof is provided with armature windings from which an electrical power is output.

In such generator, when an unbalanced load condition is caused, in which load conditions in the three phase armature windings are different with respective phases, a negative phase rotating magnetic field is generated in the rotor due to the unbalanced armature current.

The negative phase rotating magnetic field contains an asynchronous magnetic field component composed of a single component having an angular frequency $2\omega$ which is two times of the angular frequency $\omega$ of the output voltage. When such negative phase rotating magnetic field is generated, an eddy current is induced in respective conductor portions on the rotor and temperatures at the respective portions on the rotor rise beyond a predetermined allowable range.

Accordingly, for resolving the above problem JP-B-60-34340(1985) proposes a counter measure in which current flowing in axial direction on the solid iron core rotor is led toward damper windings via conductive wedges and thereby a thermal balance at respective portions on the rotor is achieved. Further, JP-B-5-64015(1993) proposes another counter measure in which resistance values of damper bars inserted into solts on the rotor are varied in an alternate manner between large and small values in circumferential direction and thereby a thermal balance at respective portions on the rotor is achieved.

FIG. 3 shows a turbine generator system constitution diagram when the turbine generator is started by a thyristor type starting device, FIGS. 4(a) and 4(b) show armature current fed from the thyristor type starting device, FIG. 5 shows a relationship of magnetomotive force vectors induced in the machine during starting by the thyristor type starting device and FIG. 6 shows a magnetomotive force of sixth order higher harmonic wave induced during starting by the thyristor type starting device.

In the these drawings, numeral 14 denotes an exciter, CONV a converter, INV an inverter, numeral 2 a rotor of the turbine generator 12, numeral 3 slots provided on the rotor 2 for accommodating field windings.

In the thyristor type starting system, since the turbine generator 12 is started as a variable speed synchronous motor, it is necessary to form a rotating magnetic field of variable frequency at the armature side. Accordingly, during starting with thyristors the thyristor type starting device 13 constituted by the inverter INV and the converter CONV is connected for feeding a balanced three phase AC current of variable frequency to the armature winding thereof, and the field windings thereof are excited by DC current. The variable frequency of the balanced three phase AC current from the thyristor type starting device 13 is adjusted to one which is synchronous with the rotating frequency of the rotor 2 and is designed to increase dependent upon increase of the rotating speed.

The current fed to the armature windings from the thyristor type starting device 13 in such instance is in a distorted waveform as shown in FIG. 4(a). As illustrated in the current waveforms, in order to maintain a condition wherein two phases among the three phases are always in conductive state, the respective phases (U phase, V phase and W phase) likely repeat in a same manner a positive polarity conductive state of 120° electrical angle, a rest state of 60° electrical angle, a negative polarity conductive state of 120° electrical angle and a rest state of 60° electrical angle.

Spectrum of the current waveform of 120° electrical angle conduction is shown in FIG. 4(b) wherein other than the current component of fundamental waveform higher harmonic current components of (6 m±1)th order are contained in the current fed to the armature windings of the turbine generator 12 from the thyristor type starting device 13. Further, during starting with thyristors the magnetomotive force Fa of armature fundamental wave is designed to be perpendicular with respect to the magnetomotive force Ff of field windings in order to maximize torque to be generated as illustrated in FIG. 5. In this instance, since higher harmonic components of (6 m±1)th order are contained in the armature current as explained above, magnetomotive force of high harmonics of 6 mth order are generated in the machine when looking at from the rotor side and elliptic rotating magnetic fields having the longer diameter on d axis and the shorter diameter on q axis are formed.

The formation of the elliptic rotating magnetic fields is explained with reference to FIG. 6 wherein an example when m= 1, in that, the magnetomotive force of higher harmonic of 6th order is taken up. Although the higher harmonics components of 5th and 7th orders in the armature current form magnetomotive forces of 5th and 7th order higher harmonics when looking at from the stator side, the magnetomotive force of 5th order higher harmonic rotates in opposite direction with respect to the rotating direction of the rotor 2 to thereby constitute magnetomotive force of 6th order higher harmonic when looking at the rotor 2 and the magnetomotive force of 7th order higher harmonic rotates in the same direction with the rotating direction of the rotor 2 to thereby constitute magnetomotive force of 6th order higher harmonic when looking at from the rotor 2.

As will be understood from the above, the magnetomotive force of 6th order higher harmonic is consisted of two vector components and the two vector components show the same direction on d axis, therefore the resultant vector on d axis is the sum of the two vector components, however since these two vector components rotate in opposite directions each other, these two vector components show opposite directions on q axis, therefore the resultant vector is the difference between the two vector components. Thus, according to the sum of these two vector components shows an elliptic form having the longer diameter on d axis and the shorter diameter on q axis as illustrated in FIG. 6. The ratio of d and q axis components of the 6th order higher harmonic is usually at 6m:1.

Now, when an asynchronous magnetic field is generated, an eddy current is induced over the surface of the rotor so as to suppress the asynchronous magnetic field. Generators now in use are provided with damper bars arranged uniformely over the rotor without regarding the position of the magnetic poles in order to optimumly suppress an asynchronous magnetic field consisting of a single component such as a negative phase rotating magnetic field which is generated during unbalanced loading. However, the inventors found out that in case of an asynchronous magnetic field consisting of a plurality of components such as experienced during starting with thyristors a larger eddy current is induced on the rotor portions between the magnetic poles in comparison with one on the rotor portion at the magnetic poles, the resistance loss distribution over the rotor surface in circumferential direction becomes non-uniform and thus an optimum damper effect can not be achieved.

SUMMARY OF THE INVENTION

The present invention is made in view of the above problem, thus an object of the present invention is to provide a turbine generator which achieves a thermal balance over the entire rotor surface of the generator during starting with thyristors and significantly reduces the starting time thereof.

The above object of the present invention is achieved such as by constituting the rotor in such a manner that the resistance loss distribution over the entire rotor surface in circumferential direction is uniformalized during starting with thyristors, by varying the physical properties or the configuration of wedges which are inserted into solts to press field windings therein and give rise to an damper effect so as to maintain a thermal balance over the entire rotor surface via the wedges, when assuming the direction of the magnetomotive force of the field windings as on d axis and the direction perpendicular to d axis as q axis by reducing smaller the resistance of the wedges positioned on q axis side of the rotor than the resistance of the wedges positioned on d axis side of the rotor, by varying the physical properties or the configuration of damper bars which are provided together with the field windings so as to maintain a thermal balance over the entire rotor surface via the damper bars, and by reducing smaller the resistance of the damper bars positioned on q axis side than the resistance of the damper bars positioned on d axis side.

More specifically, the object of the present invention is achieved such as, when assuming that the thickness in radial direction of the wedges or the damper bars positioned on d axis side of the rotor as d and the thickness in radial direction of the wedges or the damper bars positioned on q axis side of the rotor as d' by setting the relationship of the thicknesses in radial direction of these wedges or damper bars as d<d', when assuming that the resistivity of the wedges or the damper bars positioned on d axis side of the rotor as ρ and the resistivity of the wedges or the damper bars positioned on q axis side of the rotor as ρ' by using wedge or damper bar materials showing a relationship of their resistivities of ρ'<ρ, when assuming that the width in circumferential direction of the wedges positioned on d axis side of the rotor as x and the width in circumferential direction of the wedges positioned on q axis side of the rotor as x' by setting a relationship of the widthes in circumferential direction of these wedges as x<x', by coating the surface facing the gap of the wedges positioned on q axis side of the rotor with a material having a higher electrical conductivity than that of the wedges themselves, and when assuming that the width in circumferential direction of the damper bars positioned on d axis side of the rotor as x and the width in circumferential direction of the damper bars positioned on q axis side of the rotor as x' as well as assuming that the width of the slot openings positioned on d axis side of the rotor as s and the width of the slot openings positioned on q axis side of the rotor as s' by setting a relationship of the widthes in circumferential direction of these damper bars as x<x' as well as by setting a relationship of the widthes of the slot openings as s<s'.

According to the present invention thus constituted, the resistance loss distribution over the entire rotor surface in circumferential direction is uniformalized and a thermal balance over the entire rotor surface is achieved, as a result resistance to higher harmonics of the turbine generator is significantly improved, accordingly a correspondingly large current is permitted to flow through the armature windings of the turbine generator, thereby the starting time thereof can be reduced.

BRIEF DESCRIPTION OF THE DRAWINGS

FIG. 4(*a*) and FIG. 4(*b*) are diagrams illustrating armature currents fed from the thyristor type starting device relating to the present invention, wherein

FIG. 5 is a diagram illustrating a relationship between magnetomotive force vectors in the machine of the turbine generator during starting with thyristors relating to the present invention;

FIG. 8 is a cross sectional view of a turbine generator rotor illustrating another embodiment according to the present invention;

FIG. 9 is a cross sectional view of a turbine generator rotor illustrating still another embodiment according to the present invention;

FIG. 10 is a cross sectional view of a turbine generator rotor illustrating a further embodiment according to the present Invention;

FIG. 11 is a cross sectional view of a turbine generator rotor illustrating a still further embodiment according to the present invention;

DETAILED DESCRIPTION OF THE EMBODIMENTS

Hereinbelow, the embodiments of the present invention are explained in detail with reference to the drawings.

Figure 2:
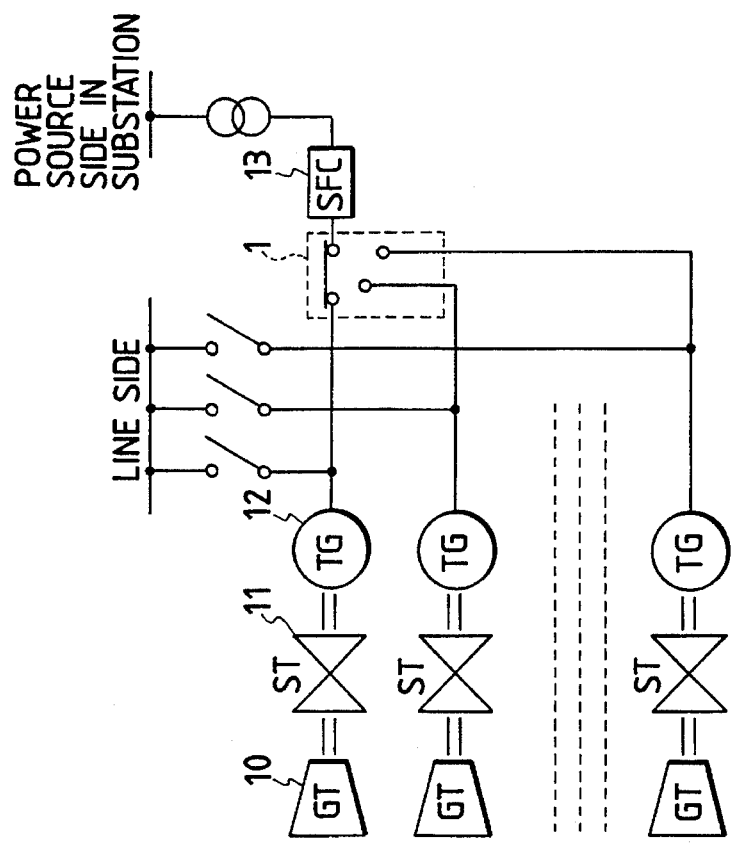
FIG. 2 is a diagram illustrating a combined cycle electric power generation system relating to the present invention.
Figure 1:
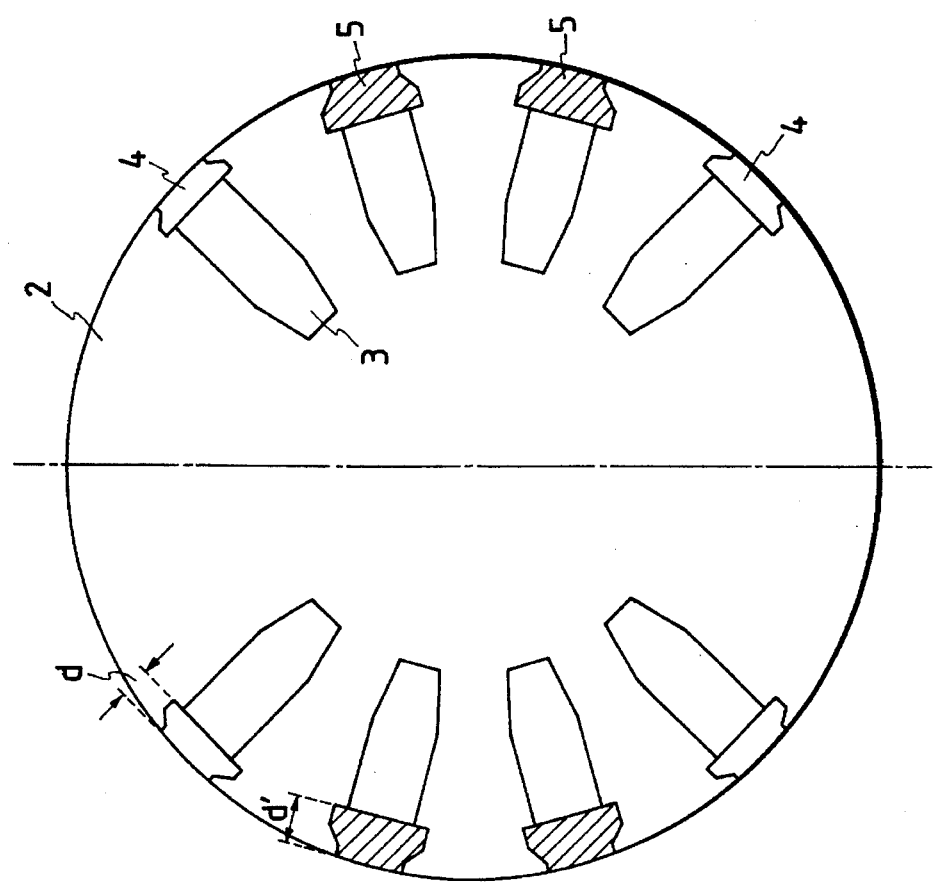
FIG. 1 is a cross sectional view of a turbine generator rotor illustrating one embodiment according to the present invention.
Figure 3:
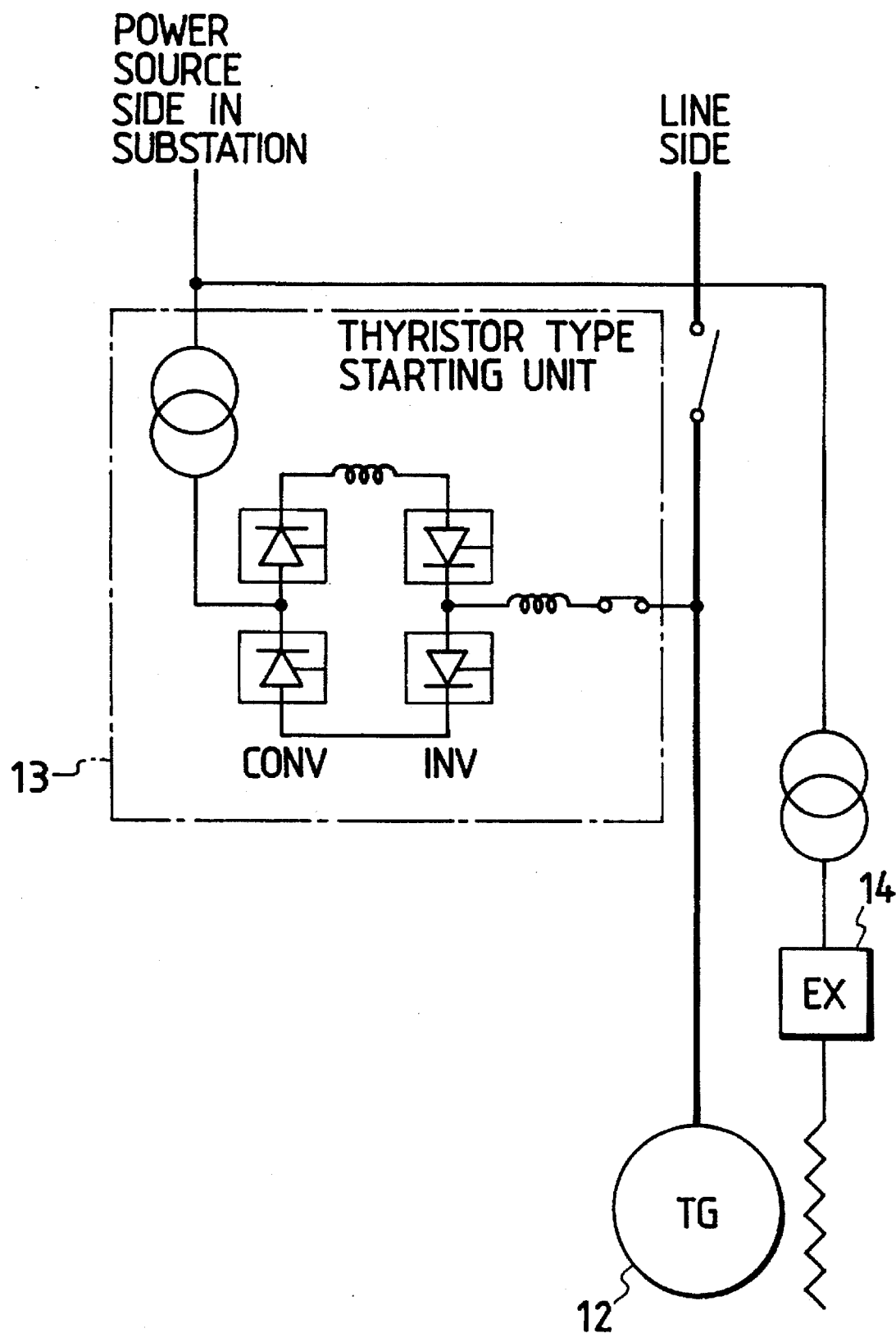
FIG. 3 is a diagram illustrating a turbine generator system with a thyristor type starting device relating to the present invention.
Figure 4A:
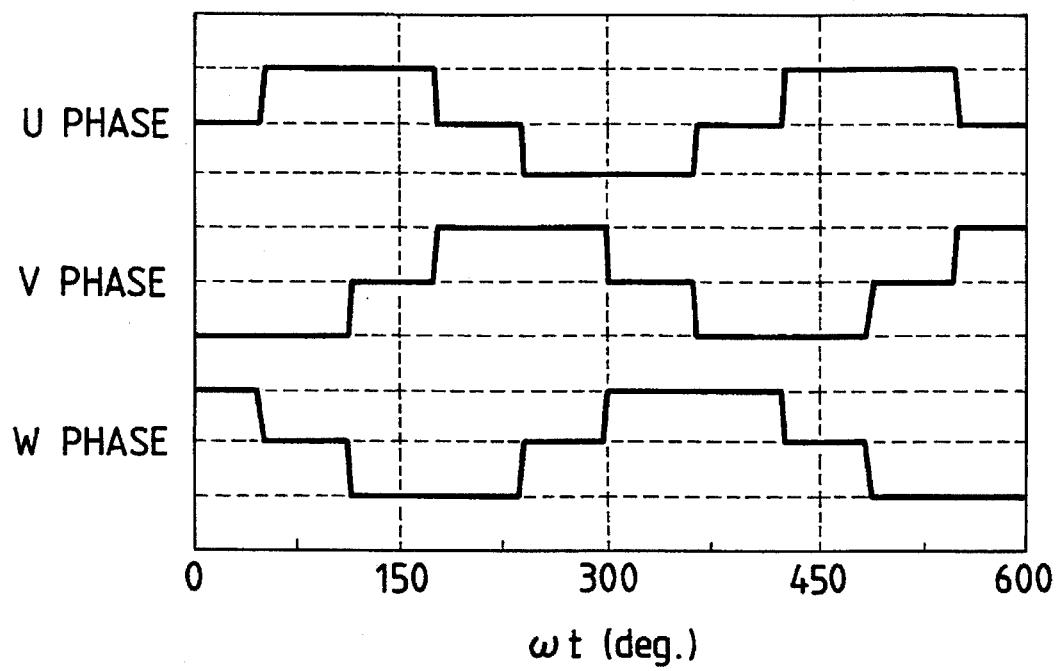
FIG. 4(a) is a diagram illustrating armature current waveforms of 120° electrical angle conduction period and FIG. 4(b) is a diagram illustrating a spectrum characteristic of the armature current.
Figure 4B:
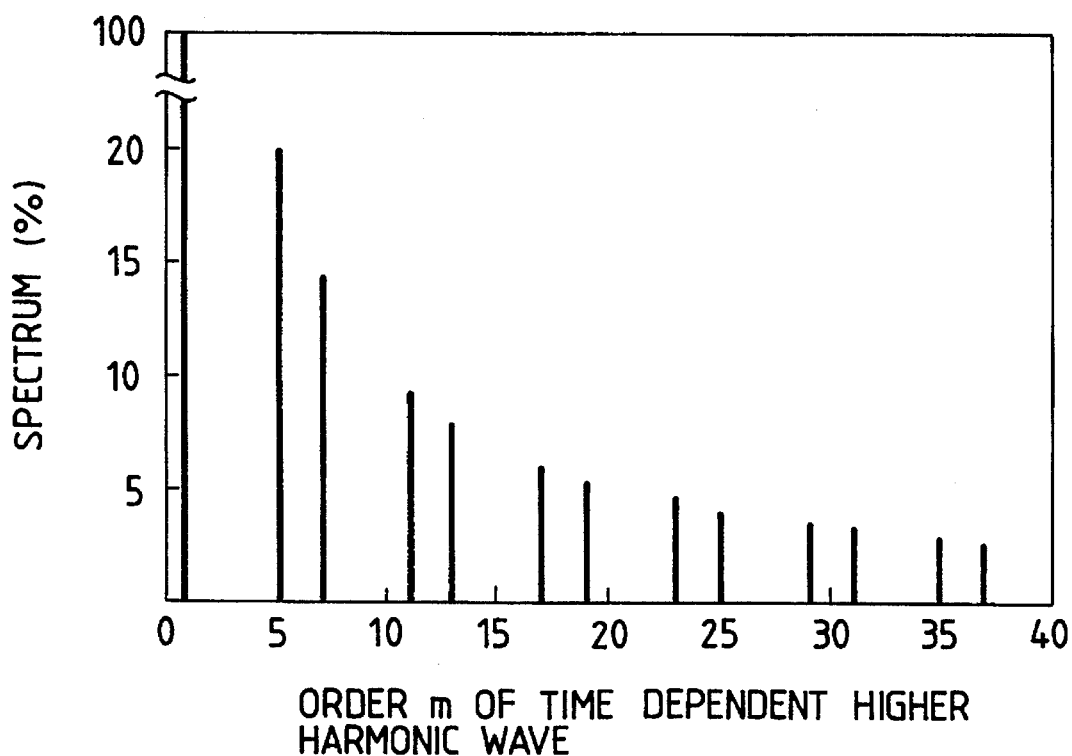
Figure 7:
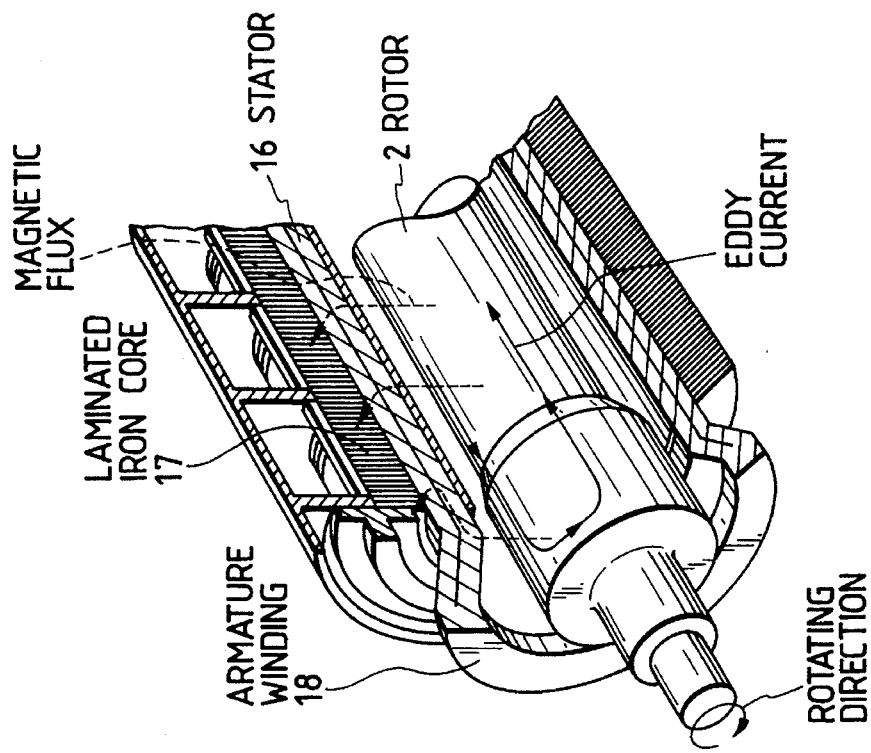
FIG. 7 is a partially broken perspective view illustrating a schematic structure of a turbine generator relating to the present invention.
Figure 6:
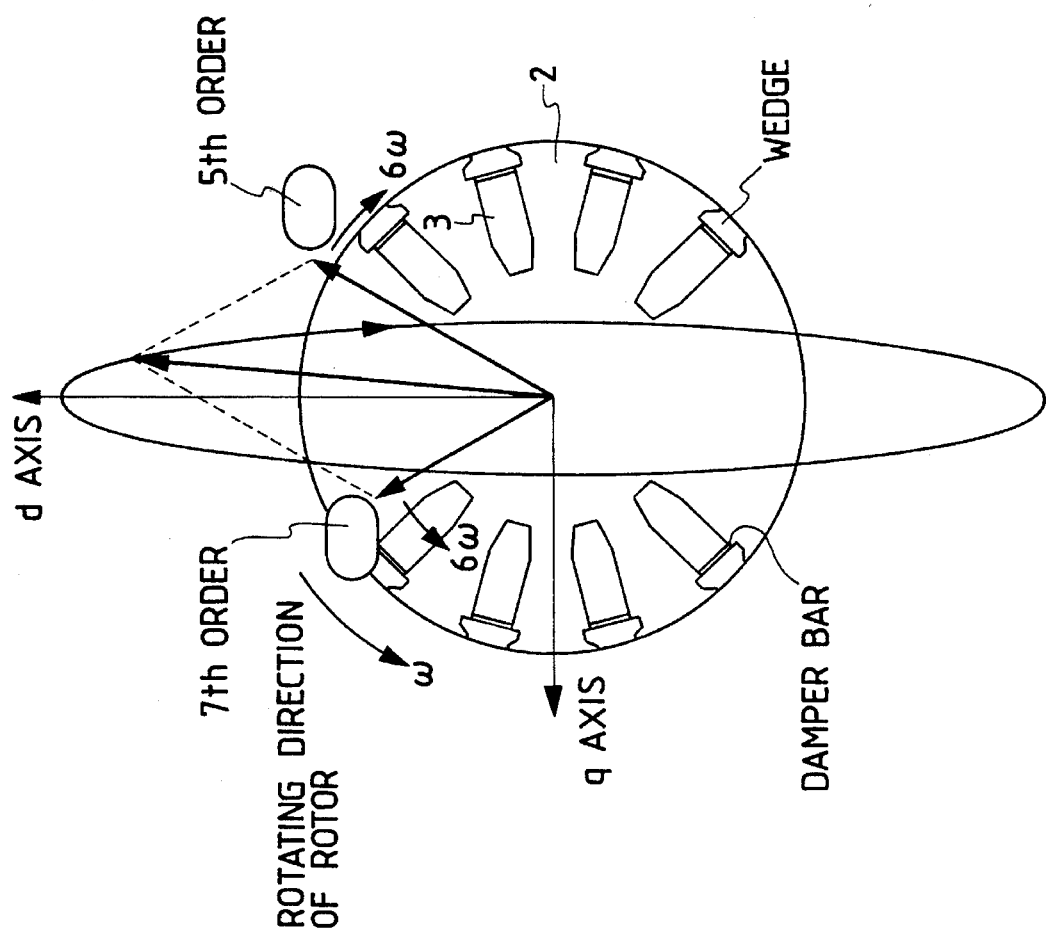
FIG. 6 is a diagram for explaining a magnetomotive force induced by higher harmonics during starting with thyristors relating to the present invention.

FIG. 1 shows a rotor of a turbine generator illustrating one embodiment of the present invention. FIG. 7 shows a structure of a turbine generator relating to the present invention. In the drawings, numeral 2 denotes a rotor, numeral 3 rotor slots for accommodating field windings, numeral 4 wedges at the side of magnetic poles (d axis) of the rotor 2, and numeral 5 wedges at the side between the magnetic poles (q axis) of the rotor 2. In the present embodiment, the generator is a rotating field type turbine generator in which a stator 16 is formed by a laminated iron core and is provided with armature windings 18. The rotor 2 is a solid iron core of cylindrical shape, the field windings are provided in the slots 3 and are held in the slots 3 via the wedges 4, 5.

The manner of uniformalizing the resistance loss distribution over the surface of the rotor 2 by varying the configuration of the wedges during starting with thyristors is explained with reference to FIG. 1. The wedges 4 and 5 are formed with metal bars with no joints in order to enhance their damper effect and their both ends are connected to respective short circuiting rings. During starting with thyristors since an elliptic rotating magnetic field having the longer diameter on d axis and the shorter diameter on q axis is generated, a larger eddy current is induced at the side between the magnetic poles on the rotor 2 than at the side on the magnetic poles on the rotor 2. Therefore, the thickness d' in radial direction of the wedges 5 positioned at the side between the magnetic poles on the rotor 2 is determined larger than the thickness d in radial direction of the wedges 4 at the side of the magnetic poles on the rotor 2 so as to reduce the resistance of the wedges 5 at the side on q axis. Since the magnitude of eddy current flowing through the respective wedges is substantially determined by their positions of the respective wedges, by means of reducing the resistance of the wedges 5 positioned at the side between the magnetic poles where a large eddy current tends to flow, the resistance loss distribution over the surface of the rotor 2 in circumferential direction is uniformalized. Accordingly, a thermal balance over the entire surface on the rotor 2 is achieved, as a result, the resistance to higher harmonics of the generator during starting thereof is improved and a correspondingly large current can be fed to the armature windings, thereby the starting time thereof can be reduced.

FIG. 8 shows a rotor of a turbine generator illustrating another embodiment according to the present invention. A manner of uniformalizing the resistance loss distribution over the surface of the rotor 2 in circumferential direction during starting with thyristors by varying the configuration of the damper bars is explained with reference to the present embodiment. In the drawing, numeral 2 denotes a rotor, numeral 3 rotor slots, numeral 6 wedges having short axial length, numeral 7 damper bars positioned at the side of the magnetic poles and numeral 8 damper bars positioned at the side between the magnetic poles. The rotor 2 of a rotating magnetic field type turbine generator is provided with the slots 3 for accommodating field windings, the wedges 6 of short axial length for holding the field windings, the damper bars 7 positioned at the side of the magnetic poles on the rotor 2 and the damper bars 8 positioned at the side between the magnetic poles on the rotor 2. Further, in the present embodiment the thickness d' in radial direction of the damper bars 8 positioned at the side between the magnetic poles on the rotor 2 is determined larger than the thickness d in radial direction of the damper bars 7 at the side of the magnetic poles on the rotor 2 so as to reduce the resistance of the damper bars 8. As a result, substantially the same advantage as obtained in connection with the FIG. 1 embodiment is obtained with the present embodiment.

FIG. 9 shows a rotor of a turbine generator illustrating still another embodiment according to the present invention. A manner of uniformalizing the resistance loss distribution over the surface of the rotor 2 in circumferential direction during starting with thyristors by varying the physical properties of the wedges is explained with reference to the present embodiment. In the present embodiment the rotor 2 of a rotating field type turbine generator is provided with the slots 3 for accommodating the field windings and wedges 4 and 5 in a form of metal bars with no joints and having a damper winding effect, and the both ends of the respective wedges 4 and 5 are connected via corresponding short circuiting rings. Herein, the wedges 4 are ones positioned at the side of the magnetic poles on the rotor 2 and the wedges 5 are ones positioned at the side between the magnetic poles on the rotor 2. Further, in the present embodiment, when assuming that the resistivity of the wedges 4 positioned at the side of the magnetic poles on the rotor 2 as p and the resistivity of the wedges 5 positioned at the side between the magnetic poles as ρ', wedge materials having a relationship of ρ>ρ' are used so as to reduce the resistance of the wedges 5 positioned at the side between the magnetic poles on the rotor 2. Examples of material combinations which satisfy the above relationship of ρ>ρ' are aluminium for the wedges 4 and copper for the wedges 5, aluminum alloy for the wedges 4 and copper alloy for the wedges 5, aluminium for the wedges 4 and copper alloy for the wedges 5, iron for the wedges 4 and aluminium for the wedges 5, iron for the wedges 4 and aluminum alloy for the wedges 5, iron for the wedges 4 and copper for the wedges 5, and iron for the wedges 4 and copper alloy for the wedges 5. As a result, substantially the same advantages as obtained in connection with the FIG. 1 embodiment is obtained with the present embodiment.

FIG. 10 shows a rotor of a turbine generator illustrating a further embodiment according to the present invention. A manner of uniformalizing the resistance loss distribution over the surface of the rotor 2 in circumferential direction during starting with thyristors by varying the physical properties of the damper bars is explained with reference to the present embodiment. In the present embodiment, the rotor 2 of a rotating field type turbine generator is provided with the slots 3 for accommodating the field windings and wedges 6 of short axial length for retaining the field windings, damper bars 7 positioned at the side of the magnetic poles on the rotor 2 and the damper bars 8 positioned at the side between the magnetic poles on the rotor 2. Further, in the present embodiment, when assuming that the resistivity of the damper bars 7 positioned at the side of the magnetic poles on the rotor 2 as ρ and the resistivity of the damper bars 8 positioned at the side between the magnetic poles as ρ', damper bar materials having a relationship of ρ>ρ' are used so as to reduce the resistance of the damper bars 8 positioned at the side between the magnetic poles on the rotor 2. Examples of material combinations which satisfy the above relationship of ρ>ρ' are the same as in the examples in FIG. 9 embodiment and substantially the same advantages as obtained in connection with the FIG. 1 embodiment is likely obtained with the present embodiment.

FIG. 11 shows a rotor of a turbine generator illustrating a still further embodiment according to the present invention. A manner of uniformalizing the resistance loss distribution over the surface of the rotor 2 in circumferential direction during starting with thyristors by varying the configuration of the wedges is explained with reference to the present embodiment. In the present embodiment the rotor 2 of a rotating field type turbine generator is provided with the slots 3 for accommodating the field windings and wedges 4 and 5 in a form of metal bars with no joints and having a damper winding effect, and the both ends of the respective wedges 4 and 5 are connected via corresponding short circuiting rings. Herein, the wedges 4 are ones positioned at the side of the magnetic poles on the rotor 2 and the wedges 5 are ones positioned at the side between the magnetic poles on the rotor 2. Further, in the present embodiment, the width x' in circumferential direction of the wedges 5 positioned between the magnetic poles of the rotor 2 is determined larger than the width x in circumferential direction of the wedges 4 positioned at the portions of the magnetic poles without varying the spacing distance between adjacent slot bottoms positioned between the magnetic poles on the rotor 2 to thereby reduce the resistance of the wedges 5. In the present embodiment, the slot opening width s' positioned between the magnetic poles on the rotor 2 can be determined either larger than or equal to the slot opening width s positioned at the portions of the magnetic poles on the rotor 2. As a result, substantially the same advantages as obtained in connection with the FIG. 1 embodiment is obtained with the present embodiment.

Figure 12:
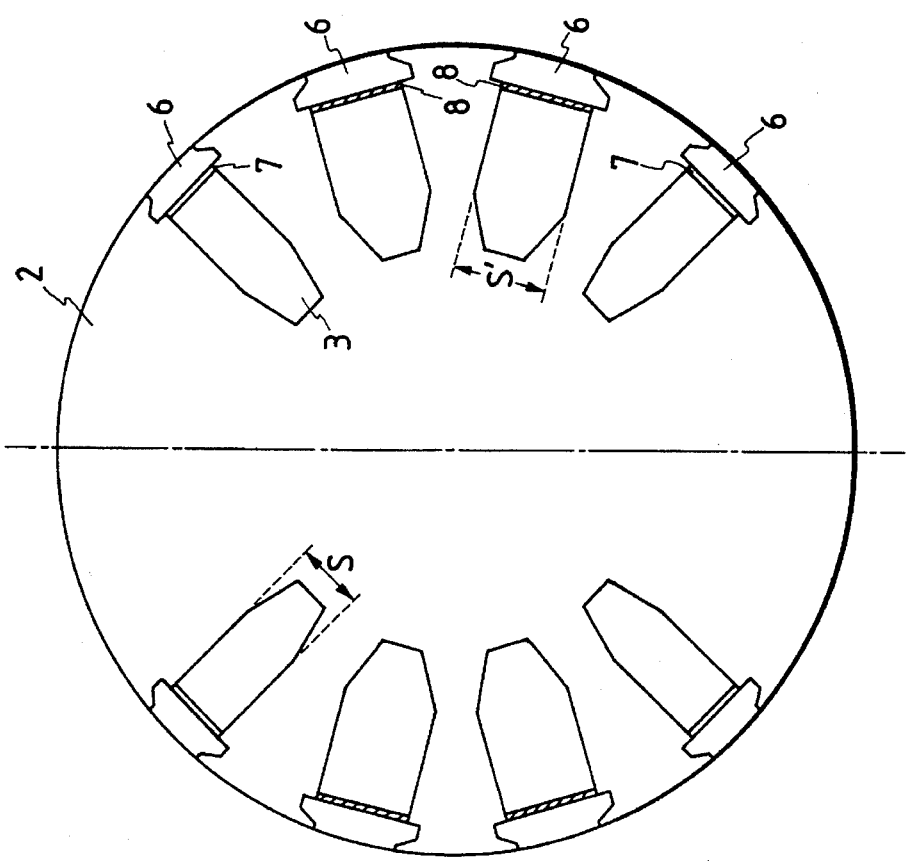
FIG. 12 is a cross sectional view of a turbine generator rotor illustrating a still further embodiment according to the present invention.

FIG. 12 shows a rotor of a turbine generator illustrating a still further embodiment according to the present invention. A manner of uniformalizing the resistance loss distribution over the surface of the rotor 2 in circumferential direction during starting with thyristors by varying the configuration of the damper bars is explained with reference to the present embodiment. In the present embodiment, the rotor 2 of a rotating field type turbine generator is provided with the slots 3 for accommodating the field windings and wedges 6 of short axial length for retaining the field windings, damper bars 7 positioned at the side of the magnetic poles on the rotor 2 and the damper bars 8 positioned at the side between the magnetic poles on the rotor 2. Further, in the present embodiment, the opening width s' of the slots 3 positioned between the magnetic poles on the rotor 2 is determined larger than the opening width s of the slots 3 positioned at the portions of the magnetic poles on the rotor 2 as well as the width in circumferential direction of the damper bars 8 positioned between the magnetic poles on the rotor 2 is determined larger than the width in circumferential direction of the damper bars 7 positioned at the portions of the magnetic poles on the rotor 2 without varying the spacing distance between adjacent slot bottoms positioned between the magnetic poles on the rotor 2, thereby the resistance of the damper bars 8 positioned between the magnetic poles on the rotor 2 is reduced and substantially the same advantages as obtained in connection with the FIG. 1 embodiment is likely obtained with the present embodiment.

Figure 13:
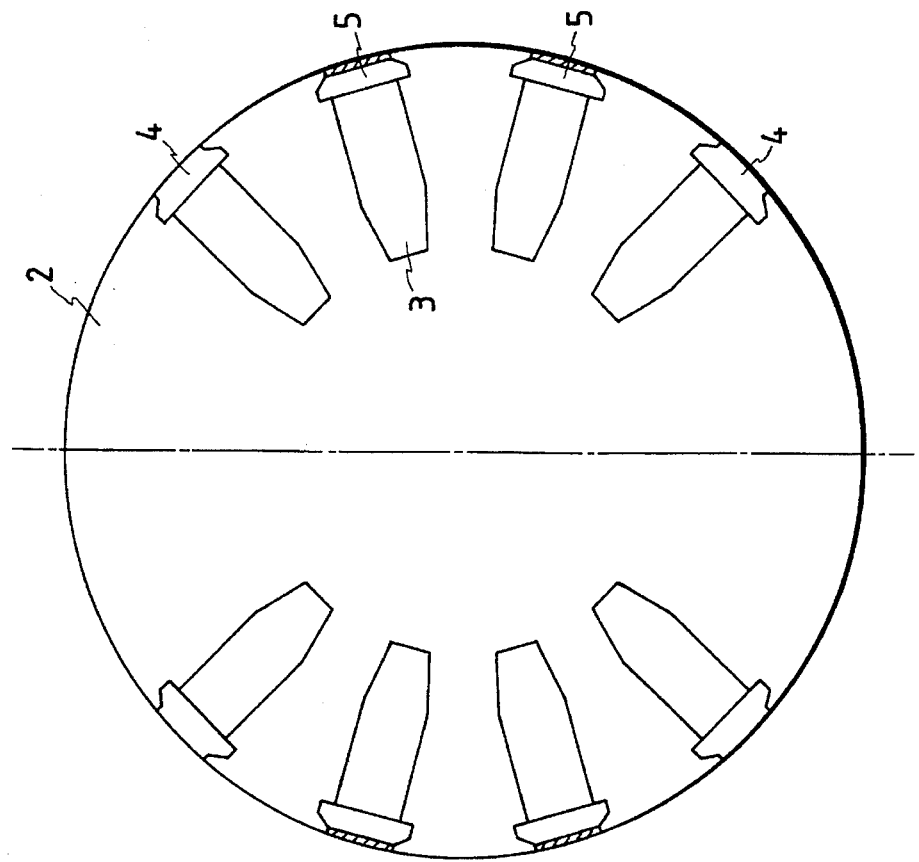
FIG. 13 is a cross sectional view of a turbine generator rotor illustrating a still further embodiment according to the present invention.

FIG. 13 shows a rotor of a turbine generator illustrating a still further embodiment according to the present invention. A manner of uniformalizing the resistance loss distribution over the surface of the rotor 2 in circumferential direction during starting with thyristors by varying the configuration of the wedges is explained with reference to the present embodiment. In the present embodiment the rotor 2 of a rotating field type turbine generator is provided with the slots 3 for accommodating the field windings and wedges 4 and 5 in a form of metal bars with no joints and having a damper winding effect, and the both ends of the respective wedges 4 and 5 are connected via corresponding short circuiting rings. Herein, the wedges 4 are ones positioned at the side of the magnetic poles on the rotor 2 and the wedges 5 are ones positioned at the side between the magnetic poles on the rotor 2. Further, in the present embodiment, the surface facing the gap of the wedges 5 positioned between the magnetic poles on the rotor 2 is coated with a material having a higher electrical conductivity than that of the wedges 4 and 5. Namely, when the wedges 4 and 5 are made of iron, copper, copper alloy or aluminium is selected for the coating material and when the wedges 4 and 5 are made of aluminium, copper or copper alloy is selected for the coating material. With thus constituting, substantially the same advantages as obtained in connection with FIG. 1 embodiment is likely obtained with the present embodiment.

Figure 14:
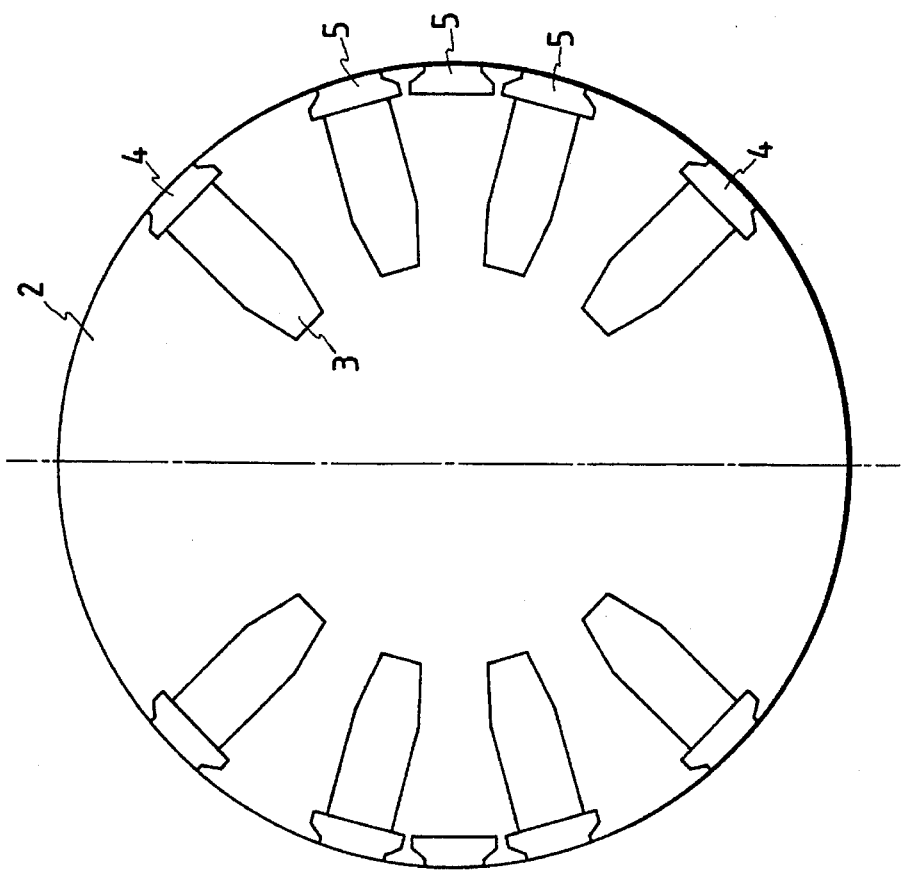
FIG. 14 is a cross sectional view of a turbine generator rotor illustrating a still further embodiment according to the present invention.

FIG. 14 shows a rotor of a turbine generator illustrating a still further embodiment according to the present invention. A manner of uniformalizing the resistance loss distribution over the surface of the rotor 2 in circumferential direction during starting with thyristors by differentiating damper effects on d axis and q axis is explained with reference to the present embodiment. In the present embodiment, the rotor 2 of a rotating field type turbine generator is provided with slots 3 for accommodating the field windings and wedges 4 and 5 in a form of metal bars with no joints and having a damper effect. Further, in the present embodiment, the rotor 2 is further provided with additional wedges 5 along the teeth portions positioned between the magnetic poles on the rotor 2. The wedges 5 positioned on q axis have a large damper effect against magnetic fluxes of higher harmonics directing in d axis but have no damper effect against magnetic fluxes of higher harmonics directing in q axis. Accordingly, an damper effect against the magnetic fluxes of higher harmonics directing in d axis on the rotor 2 is strengthened and the burden of the respective wedges 5 sharing the eddy current flowing therethrough is reduced, the resistance loss distribution over the entire surface of the rotor 2 is uniformalized and a thermal balance over the entire surface on the rotor 2 is achieved. As a result, the resistance to higher harmonics of the generator during starting thereof is improved, and a correspondingly large current can be fed to the armature windings, thereby the starting time thereof can be reduced.

Figure 15:
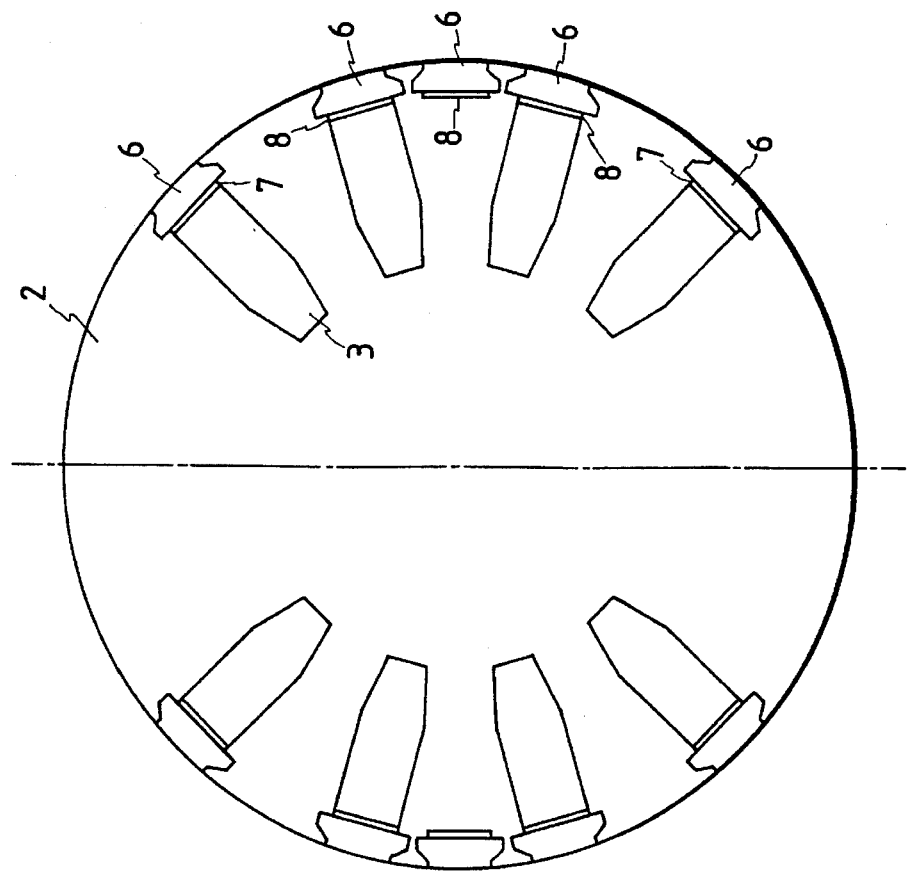
FIG. 15 is a cross sectional view of a turbine generator rotor illustrating a still further embodiment according to the present invention.

FIG. 15 shows a rotor of a turbine generator illustrating a still further embodiment according to the present invention. A manner of uniformalizing the resistance loss distribution over the surface of the rotor 2 in circumferential direction during starting with thyristors by differentiating damper effects on d axis and q axis is explained with reference to the present embodiment. In the present embodiment, the rotor 2 of a rotating field type turbine generator is provided with slots 3 for accommodating the field windings, wedges 6 of short axial length for retaining the field windings, damper bars 7 positioned at the side of the magnetic poles on the rotor 2 and the damper bars 8 positioned at the side between the magnetic poles on the rotor 2. Further, in the present embodiment, the rotor 2 is further provided with additional damper bars 8 along the teeth portions positioned between the magnetic poles on the rotor 2. Accordingly, the burden of the respective damper bars 8 sharing the eddy current flowing therethrough is reduced, and substantially the same advantages obtained in FIG. 14 embodiment are likely obtained with the present embodiment.

In the above embodiments, rotors having two poles and eight slots are illustrated. However, the present invention can be likely applied to rotors having any number of poles and any number of slots.

According to the present invention as explained herein above, the elliptic rotating magnetic field which is caused in the machine during starting by making use of thyristors is suppressed by the damper windings, thereby a thermal balance over the entire portions on the rotor of the turbine generator can be achieved and the resistance against higher harmonics thereof is improved. As a result, a correspondingly large current can be fed to the armature windings and thereby the starting time thereof can be reduced.

We claim:

1. A turbine generator which is designed to be started with thyristors comprising a stator (16) provided with armature windings (18) and a rotor (2) disposed facing said stator (16) and provided with a plurality of slots (3) arranged in circumferential direction with a predetermined interval and extending along axial direction, field windings disposed in said slots (3) and wedges (4, 5) having a damper effect inserted in said slots (3) so as to retain said field windings therein, when assuming that the direction of magnetomotive force induced by said field windings as d axis and the direction perpendicular to d axis as q axis, the physical property or the configuration of said wedges (4) positioned at q axis side on said rotor (2) being varied from the physical property or the configuration of said wedges (4) positioned at d axis side on said rotor (2) in such a manner that the heating of the respective wedges (4, 5) due to resistance loss caused by current flowing therethrough during starting with thyristors of the turbine generator is uniformalized in circumferential direction of said rotor (2), and a thermal balance between said wedges (5) positioned at q axis side on said rotor (2) and said wedges (4) positioned at d axis side on said rotor (2) is maintained during starting with thyristors of the turbine generator.

2. A turbine generator which is designed to be started with thyristors comprising a stator (16) provided with armature windings (18) and a rotor (2) disposed facing said stator (16) and provided with a plurality of slots (3) arranged in circumferential direction with a predetermined interval and extending along axial direction, field windings disposed in said slots (3) and wedges (4, 5) having a damper effect inserted in said slots (3) so as to retain said field windings therein, when assuming that the direction of magnetomotive force induced by said filed windings as d axis and the direction perpendicular to d axis as q axis, the resistance of said wedges (5) positioned at q axis side on said rotor (2) being determined smaller than the resistance of said wedges (4) positioned at d axis side on said rotor (2).

3. A turbine generator which is designed to be started with thyristors comprising a stator (16) provided with armature windings (18) and a rotor (2) disposed facing said stator (16) and provided with a plurality of slots (3) arranged in circumferential direction with a predetermined interval and extending along axial direction, field windings disposed in said slots (3) and wedges (4, 5) having a damper effect inserted in said slots (3) so as to retain said field windings therein, when assuming that the direction of magnetomotive force induced by said field windings as d axis and the direction perpendicular to d axis as q axis as well as the thickness in radial direction of said wedges (4) positioned at d axis side on said rotor (2) as d and the thickness in radial direction of said wedges (5) positioned at q axis side on said rotor (2) as d', the relationship between the thickness in radial direction of said wedges (4, 5) being set at d<d'.

4. A turbine generator which is designed to be started with thyristors comprising a stator (16) provided with armature windings (18) and a rotor (2) disposed facing said stator (16) and provided with a plurality of slots (3) arranged in circumferential direction with a predetermined interval and extending along axial direction, field windings disposed in said slots (3) and wedges (4, 5) having a damper effect inserted in said slots (3) so as to retain said field windings therein, when assuming that the direction of magnetomotive force induced by said field windings as d axis and the direction perpendicular to d axis as q axis as well as the resistivity of said wedges (4) positioned at d axis side on said rotor (2) as $\rho$ and the resistivity of said wedges (5) positioned at q axis side on said rotor (2) as $\rho'$ materials showing a relationship between the resistivities of $\rho'<\rho$ being used for said wedges (4, 5).

5. A turbine generator which is designed to be started with thyristors comprising a stator (16) provided with armature windings (18) and a rotor (2) disposed facing said stator (16) and provided with a plurality of slots (3) arranged in circumferential direction with a predetermined interval and extending along axial direction, field windings disposed in said slots (3) and wedges (4, 5) having a damper effect inserted in said slots (3) so as to retain said field windings therein, when assuming at the direction of magnetomotive force induced by said field windings as d axis and the direction perpendicular to d axis as q axis as well as the width in circumferential direction of said wedges (4) positioned at d axis side on said rotor (2) as x and the width in circumferential direction of said wedges (5) positioned at q axis side on said rotor (2) as x', the relationship between the widths in circumferential direction of said wedges (4, 5) being set at x<x'.

6. A turbine generator which is designed to be started with thyristors comprising a stator (16) provided with armature windings (18) and a rotor (2 disposed facing said stator (16) and provided with a plurality of slots (3) arranged in circumferential direction with a predetermined interval and extending along axial direction, field windings disposed in said slots (3) and wedges (4, 5) having a damper effect inserted in said slots (3) so as to retain said field windings therein, when assuming that the direction of magnetomotive force induced by said field windings as d axis and the direction perpendicular to d axis as q axis, the surface facing said stator of said wedges (5) positioned at q axis side on said rotor (2) being coated with a material having a higher electrical conductivity than that of said wedges (4, 5).

7. A turbine generator which is designed to be started with thyristors comprising a stator (16) provided with armature windings (18) and a rotor (2) disposed facing said stator (16) and provided with a plurality of slots (3) arranged in circumferential direction with a predetermined interval and extending along axial direction, field windings disposed in said slots (3), damper bars (7, 8) and wedges (6) having a damper effect inserted in said slots (3) so as to retain said field windings therein, when assuming that the direction of magnetomotive force induced by said field windings as d axis and the direction perpendicular to d axis as q axis, the physical property or the configuration of said wedges (4) positioned at q axis side on said rotor (2) being varied from the physical property or the configuration of said wedges (4) positioned at d axis side on said rotor (2) in such a manner that the heating of the respective wedges (4, 5) due to resistance loss caused by current flowing therethrough during starting with thyristors of the turbine generator is uniformalized in circumferential direction of said rotor (2), and a thermal balance between said wedges (5) positioned at q axis side on said rotor (2) and said wedges (4) positioned at d axis side on said rotor (2) is maintained during starting with thyristors of the turbine generator.

8. A turbine generator which is designed to be started with thyristors comprising a stator (16) provided with armature windings (18) and a rotor (2) disposed facing said stator (16) and provided with a plurality of slots (3) arranged in circumferential direction with a predetermined interval and extending along axial direction, field windings disposed in said slots (3), damper bars (7, 8) and wedges (6) having a damper effect inserted in said slots (3) so as to retain said field windings therein, when assuming that the direction of magnetomotive force induced by said field windings as d axis and the direction perpendicular to d axis as q axis, the resistance of said damper bars (8) positioned at q axis side on said rotor (2) being determined smaller than the resistance of said damper bars (7) at d axis side on said rotor (2).

9. A turbine generator which is designed to be started with thyristors comprising a stator (16) provided with armature windings (18) and a rotor (2) disposed facing said stator (16) and provided with a plurality of slots (3) arranged in circumferential direction with a predetermined interval and extending along axial direction, field windings disposed in said slots (3), damper bars (7, 8) and wedges (6) having a damper effect inserted in said slots (3) so as to retain said field winding therein, when assuming that the direction of magnetomotive force induced by said field windings as d axis and the direction perpendicular to d axis as q axis as well as the thickness in radial direction of said damper bars (7) positioned at d axis side on said rotor (2) as d and the thickness in radial direction of said damper bars (8) positioned at q axis side on said rotor (2) as d', the relationship between the thicknesses in radial direction of said damper bars (7, 8) being set at d<d'.

10. A turbine generator which is designed to be started with thyristors comprising a stator (16) provided with aramture windings (18) and a rotor (2) disposed facing said stator (16) and provided with a plurality of slots (3) arranged in circumferential direction with a predetermined interval and extending along axial direction, field windings disposed in said slots (3), damper bars (7, 8) and wedges (6) having a damper effect inserted in said slots (3) so as to retain said field windings therein, when assuming that the direction of magnetomotive force induced by said field windings as d axis and the direction perpendicular to d axis as q axis as well as the resistivity of said damper bars (7) positioned at d axis side on said rotor (2) as ρ and the resistivity of said damper bars (8) positioned at q axis side on said rotor (2) as ρ' materials showing a relationship between the resistivities of ρ'<ρ'being used for said damper bars (7, 8).

11. A turbine generator which is designed to be started with thyristors comprising a stator (16) provided with arma-ture windings (18) and a rotor (2) disposed facing said stator (16) and provided with a plurality of slots (3) arranged in circumferential direction with a predetermined interval and extending along axial direction, field windings disposed in said slots (3), damper bars (7, 8) and wedges (6) having a damper effect inserted in said slots (3) so as to retain said field windings therein, when assuming that the direction of magnetomotive force induced by said field windings as d axis and the direction perpendicular to d axis as q axis as well as the width in circumferential direction of said damper bars (7) at d axis side on said rotor (2) as x and the width in circumferential direction of said damper bars (8) positioned at q axis side on said rotor (2) as x', further assuming that the opening width of said slots (3) positioned at d axis side on said rotor (2) s and the opening width of said slots (3) positioned at q axis side on said rotor (2) as s', the relationship between the widths in circumferential direction of said damper bars (7, 8) and the relationship between the opening widths of said slots (3) being respectively set at x<x' and s<s'.

12. A turbine generator which is designed to be started with thyristors comprising a stator (16) provided with arma-ture windings (18) and a rotor (2) disposed facing said stator (16) and provided with a plurality of slots (3) arranged in circumferential direction with predetermined interval and extending along axial direction, field windings disposed in said slots (3) and wedges (4, 5) having a damper effect inserted in said slots (3) so as to retain said field windings therein, when assuming that the direction of magnetomotive force induced by said field windings as d axis and the direction perpendicular to d axis as q axis, the force induced by said field windings as d axis and the direction perpendicular to d axis as q axis, the resistance of said wedges (5) positioned at q axis side on said rotor (2) being determined smaller than the resistance of said wedges (4) positioned at d axis side on said rotor (2) as well as further wedges (5) having a damper effect being provided along teeth portions at q axis side on said rotor (2).

13. A turbine generator which is designed to be started with thyristors comprising a stator (16) provided with armature windings (18) and a rotor (2) disposed facing said stator (16) and provided with a plurality of slots (3) arranged in circumferential direction with a predetermined interval and extending along axial direction, field windings disposed in said slots (3), damper bars (7, 8) and wedges (6) having a damper effect inserted in said slots (3) so as to retain said field winding therein, when assuming that the direction of magnetomotive force induced by said field windings as d axis and the direction perpendicular to d axis as q axis, the resistance of said damper bars (8) positioned at q axis side on said rotor (2) being determined smaller than the resistance of said damper bars (7) positioned at d axis side on said rotor (2) as well as further damper bars (8) being provided along teeth portions at q axis side on said rotor (2).

* * * * *